No. 844,964. PATENTED FEB. 19, 1907.
C. J. SINGER.
GATE.
APPLICATION FILED SEPT. 22, 1906.
2 SHEETS—SHEET 1.
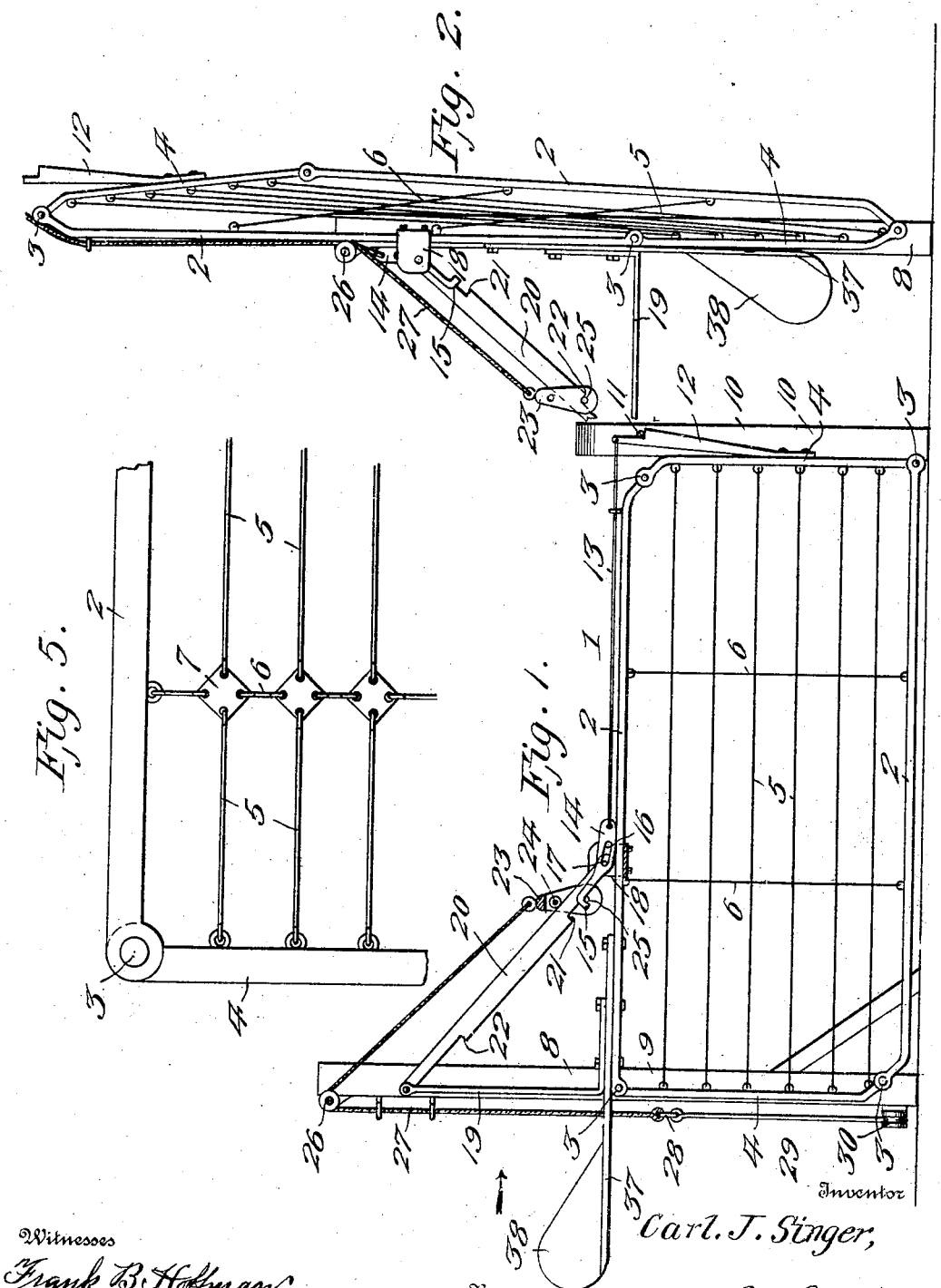
Witnesses
Frank B. Hoffman
Inventor
Carl J. Singer,
By Victor J. Evans
Attorney

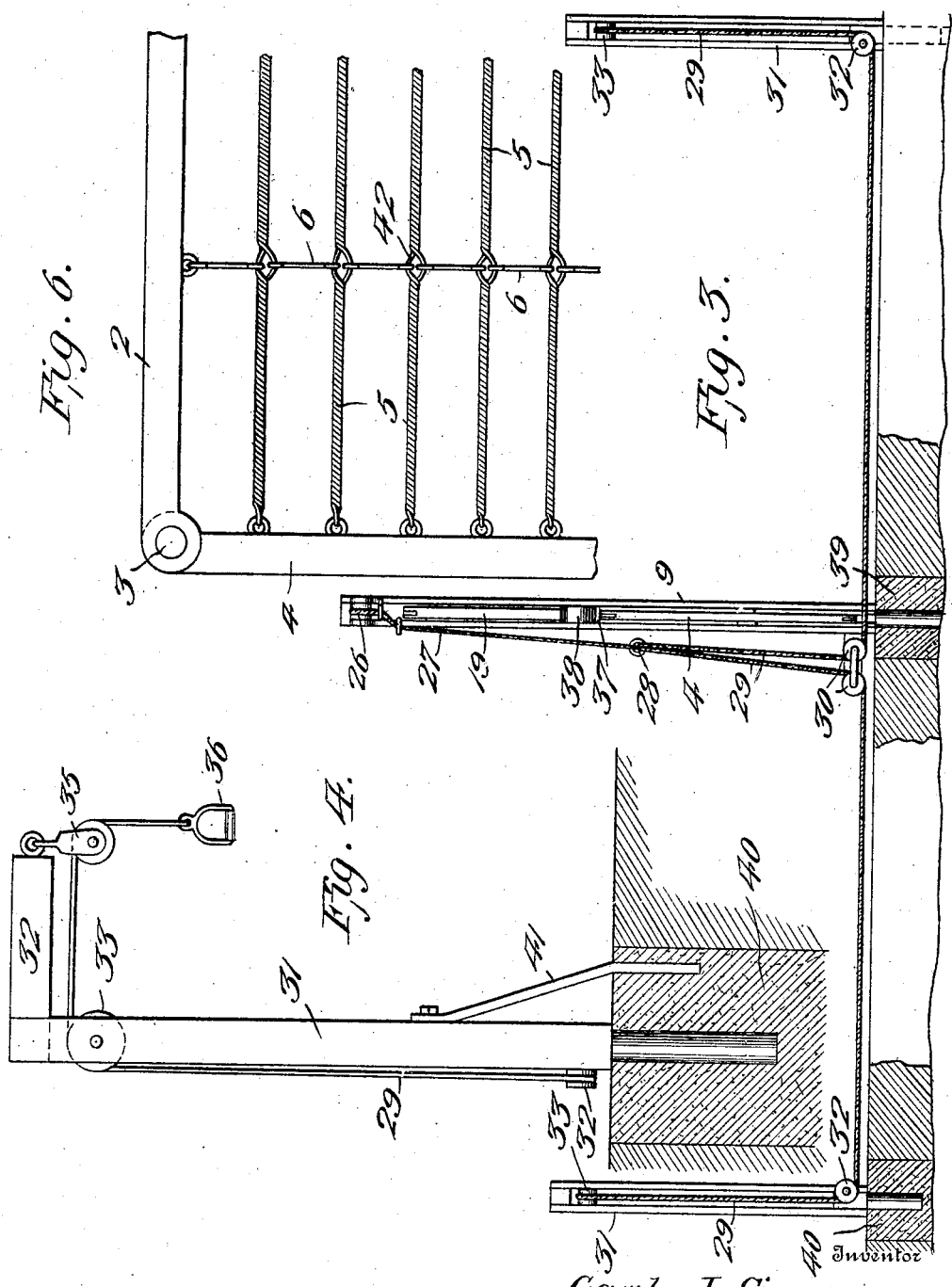

UNITED STATES PATENT OFFICE.

CARL J. SINGER, OF WASHINGTON, DISTRICT OF COLUMBIA.

GATE.

No. 844,964.

Specification of Letters Patent.

Patented Feb. 19, 1907.

Application filed September 22, 1906. Serial No. 335,791.

*To all whom it may concern:*

Be it known that I, CARL J. SINGER, a citizen of the United States, residing at Washington, in the District of Columbia, have invented new and useful Improvements in Gates, of which the following is a specification.

This invention relates to gates of the vertical-swinging type, being especially directed to the gate-operating mechanism, and has for its objects to produce a comparatively simple inexpensive device of this character wherein the gate when opened will swing vertically upward and be folded into compact unobstructing condition, one wherein the gate will be positively moved to open or closed position, and one which permits of the gate being operated at a point remote from either side thereof and by a person seated in a vehicle or on horseback, and this without dismounting.

With these and other objects in view the invention comprises the novel features of construction and combination of parts more fully hereinafter described.

In the accompanying drawings, Figure 1 is a side elevation of a gate embodying the invention and showing the same in closed position. Fig. 2 is a similar view showing the gate open. Fig. 3 is a rear elevation of the gate as viewed in the direction of the arrow in Fig. 1. Fig. 4 is a side elevation of one of the standards. Fig. 5 is an enlarged detail view of a portion of the gate, showing the manner of connecting the cross-wires. Fig. 6 is a similar view showing a modified form of connection between the cross-wires.

Referring to the drawings, it will be seen that the gate 1 comprises in accordance with the invention upper and lower longitudinal bars or rails 2, pivoted at their ends, as at 3, to the ends of the end bars or members 4, which, with the bars 2, form an open substantially rectangular foldable frame, in which are terminally connected a series of longitudinal fencing elements or wires 5 and a plurality of transverse fencing elements or wires 6, which at their points of juncture or intersection with the wires 5 are loosely engaged with coupling members or plates 7, to which the ends of the component sections of the wires 5 are also loosely connected, thus adapting the gate as a whole to readily fold or collapse, as more fully hereinafter explained.

The gate is pivoted at its upper rear corner by means of the pintle 3 between the spaced side portions or members 8 of a rear post or standard 9, while the forward end of the gate when in closed position seats in the space between the side portions or plates of a front or latch post 10, in which is fixed a horizontal pin or keeper 11, adapted for engagement by a movable latch member 12, attached at its lower end to the front end bar 4 and having its upper end connected, by means of a traction element or wire 13, with a tripping member or lever 14, provided at its rear end with an engaging portion or hook 15 and having between its ends a slot 16, designed to receive a pintle 17, which is engaged with a bearing member 18 for attaching the lever to the gate.

Attached to and rising vertically from the gate in line with the rear end bar 4 is an arm 19, to which is attached the upper end of a forwardly and downwardly inclined guide-rail 20, having its lower end engaged with the pintle 17 and provided between its ends with a pair of spaced engaging portions or shoulders 21 22 and on which there is disposed a weighted traveler block or head 23, in which is journaled a roller 24, arranged to travel on the upper edge of the rail 20 for insuring free movement of the block thereon, there being extended through the block a transverse engaging pin 25, adapted for engagement with the hooked end 15 of the tripping-lever to actuate the latter and for engagement with the shoulders 21 22 for a purpose which will presently appear.

Arranged for travel between its ends over a guide-pulley 26, journaled in a suitable bearing in the upper end of the post 9, is a flexible operating element or cable 27, having one of its ends attached to the traveler-block 23 and its other end connected, by means of a coupling-ring 28, with a pair of flexible traction elements or cables 29, which travel, respectively, over guide-pulleys 30, journaled at the lower end of post 9 and from which the elements extend in reverse directions to vertical posts or standards 31, planted at opposite sides of and at points suitably remote from the gate, there being journaled to each of the posts 31 a lower guide-pulley 32 and an upper guide-pulley 33, over which the adjacent cable 29 travels, while fixed to the upper end of each of the posts 31 and to extend in a direction transversely of the roadway is a horizontal arm 34, having suspended from its outer end a pulley-block 35, through which the traction-cable is extended and terminally provided with handpieces 36.

Attached to the upper rail 2 of the gate is a normally horizontal rearwardly-projecting arm 37, equipped at its rear end with a weight 38, adapted to counterbalance the weight of the gate for insuring ready movement of the latter.

The lower end of the post 9 is planted in a cement foundation 39, while the lower ends of the posts 31 are in like manner planted at their lower ends in cement foundations 40, there being attached to the posts 31 bracing members 41, having their lower ends embedded in the foundations 40.

In practice when the gate is closed, as in Fig. 1, the latch member 12 engages the keeper 11 to lock the gate against opening movement, while the traveler-block 23 stands in position adjacent the lower end of rail 20, with the pin 25 in engagement with the engaging hook 15. Under these conditions in order to open the gate one of the handpieces 36 is grasped and pulled downward, which serves through the medium of the cables 29 and 27 to cause the block 23 to travel upward on the rail 20, the lever 14 being on the initial movement of the block actuated for exerting traction on the connection 13 to move the latch 12 out of engagement with the keeper, after which the lever 14 will, owing to the pin 17 traveling in the slot 16, move upward until the pin 25 engages the shoulder 21 for holding the block 23 against movement. The gate will then be positively swung upward and will during its upward movement fold and assume the position shown in Fig. 2, with the rail 20 projecting rearwardly and downwardly, whereupon the block 23 will slide automatically downward on said rail and the pin 25 become engaged with the shoulder 22, whereby traction exerted on either of the cables 29 will serve to positively return the gate to closed position. It will be understood that in the operation the weight 38 will properly counterbalance the weight of the gate, thus to insure ready opening and closing of the same.

In Fig. 6 there is illustrated a slight modification in the construction of the gate in which the longitudinal wires 5 are of twisted formation provided at appropriate points with open loops 42, with which the ends of the transverse wires 6 are loosely engaged for the purpose heretofore explained. In other respects the construction and operation of the gate are identical with that above described.

Having thus described my invention, what I claim is—

1. In a device of the class described, a gate-post, a gate pivoted thereto to swing vertically to open position, a movable latch member carried by the gate, a bearing attached to the upper rail of the gate, a movable tripping-lever having a slot-and-pin connection with the bearing and provided with an engaging portion, said lever being operatively connected with the latch member, an inclined rail fixed on the gate and having engaging portions, a traveler-block arranged for movement on the rail and provided with a part which normally engages the engaging portion of the tripping-lever for operating the latter to move the latch to releasing position, said part being formed for engagement with the engaging portions of the rail to fix the block against movement on the latter, and means connected with and for operating the block to move the gate to open or closed position.

2. In a device of the class described, a gate-post, a gate pivoted thereto to swing in a vertical plane, a movable latch member carried by the gate, a bearing attached to the latter, a movable tripping-lever having a slot-and-pin connection with the bearing and provided at its rear end with an engaging hook, a connection between the lever and latch member, an inclined rail fixedly mounted on the gate and provided with spaced stop-shoulders, a traveler-block arranged for movement on the rail and having a part which normally engages the hook portion of the lever for moving the same to operate the latch, said part being designed for engagement with the stop-shoulders for fixing the block against movement on the rail, and means connected with and for operating the block to move the gate to open or closed position.

In testimony whereof I affix my signature in presence of two witnesses.

CARL J. SINGER.

Witnesses:
JOHN L. FLETCHER,
MARY L. BRAHLER.